(12) United States Patent
Roberts et al.

(10) Patent No.: US 8,949,069 B2
(45) Date of Patent: Feb. 3, 2015

(54) POSITION DETERMINATION BASED ON PROPAGATION DELAY DIFFERENCES OF MULTIPLE SIGNALS RECEIVED AT MULTIPLE SENSORS

(75) Inventors: Richard D. Roberts, Hillsboro, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 12/639,236

(22) Filed: Dec. 16, 2009

(65) Prior Publication Data

US 2011/0144941 A1 Jun. 16, 2011

(51) Int. Cl.
*G01C 22/00* (2006.01)
*G01C 9/00* (2006.01)
*G01S 5/02* (2010.01)
*G01B 11/14* (2006.01)
*G01B 11/00* (2006.01)
*G01S 5/06* (2006.01)

(52) U.S. Cl.
CPC . *G01S 5/02* (2013.01); *G01B 11/14* (2013.01); *G01B 11/002* (2013.01); *G01S 5/06* (2013.01)
USPC .............................. 702/159; 702/150; 702/151

(58) Field of Classification Search
CPC .... G01B 11/002; G01B 11/14; G01C 15/002; G01C 22/006
USPC .......................................... 702/159, 150, 151
See application file for complete search history.

(56) References Cited

U.S. PATENT DOCUMENTS

| 5,081,344 | A | * | 1/1992 | Misawa | ..................... 250/201.4 |
| 5,119,104 | A | | 6/1992 | Heller | |
| 5,914,687 | A | | 6/1999 | Rose | |
| 5,915,233 | A | * | 6/1999 | Nonaka | ......................... 702/158 |
| 6,031,600 | A | * | 2/2000 | Winner et al. | ............... 356/3.01 |
| 6,801,782 | B2 | | 10/2004 | McCrady et al. | |

(Continued)

FOREIGN PATENT DOCUMENTS

WO 2012/087944 A2 6/2012

OTHER PUBLICATIONS

Wen et al., "Distance Estimation Using Bidirectional Communications Without Synchronous Clocking", Feb. 4, 2006.*

(Continued)

*Primary Examiner* — Michael Nghiem
(74) *Attorney, Agent, or Firm* — Garrett IP (57) ABSTRACT

Methods and systems to determine at multi-dimensional coordinates of an object based on propagation delay differences of multiple signals received from the object by each of a plurality of sensors. The signals may include optical signals in a human visible spectrum, which may be amplitude modulated with corresponding frequency tones. An envelope may be detected with respect to each of the sensors, and signals within each envelope may be separated. A phase difference of arrival may be determined for each of the signals, based on a difference in propagation delay times of the signal with respect to multiple sensors. The phase differences of arrival may be converted to corresponding distance differences between a corresponding transmitter and the corresponding sensors. A linear distance and a perpendicular offset distance may be determined from a combination the distance differences, a distance between the corresponding transmitters, and a distance between the corresponding sensors.

20 Claims, 10 Drawing Sheets

(56) References Cited

U.S. PATENT DOCUMENTS

| | | | |
|---|---|---|---|
| 7,132,981 | B1 | 11/2006 | Roberts |
| 7,292,631 | B2 | 11/2007 | Gregorius |
| 8,411,258 | B2 | 4/2013 | Roberts et al. |
| 2001/0053699 | A1 | 12/2001 | McCrady et al. |
| 2004/0247025 | A1 | 12/2004 | Gregorius |
| 2006/0094350 | A1* | 5/2006 | Ishimura et al. ............... 455/9 |
| 2006/0132353 | A1* | 6/2006 | Natsume et al. ............ 342/147 |
| 2006/0285102 | A1 | 12/2006 | Aoki et al. |
| 2007/0102619 | A1 | 5/2007 | Kusaka |
| 2007/0296951 | A1 | 12/2007 | Kuijk et al. |
| 2008/0108372 | A1 | 5/2008 | Breed |
| 2008/0143584 | A1* | 6/2008 | Shoarinejad et al. ......... 342/127 |
| 2009/0134918 | A1 | 5/2009 | Tzeng |
| 2009/0243679 | A1 | 10/2009 | Smith et al. |
| 2009/0251976 | A1 | 10/2009 | Amarilio et al. |
| 2010/0067633 | A1 | 3/2010 | Den Besten |
| 2010/0156459 | A1 | 6/2010 | Plants et al. |
| 2010/0207820 | A1* | 8/2010 | Kawano et al. ............... 342/393 |
| 2010/0225370 | A1 | 9/2010 | Demone |
| 2011/0018601 | A1 | 1/2011 | Yoshizawa et al. |
| 2011/0074477 | A1 | 3/2011 | Nagarajan et al. |
| 2011/0148486 | A1 | 6/2011 | Mosalikanti et al. |
| 2011/0261347 | A1 | 10/2011 | Kassamakov et al. |
| 2012/0162633 | A1 | 6/2012 | Roberts et al. |
| 2013/0293423 | A1* | 11/2013 | Moshfeghi ................... 342/465 |
| 2014/0180634 | A1* | 6/2014 | Mahajan ...................... 702/159 |

OTHER PUBLICATIONS

Bucher, et al., "A synthesizable VHDL Model of the exact solution for three-dimensional hyperbolic positioning System", VLSI Design, 2002, vol. 15 (2), pp. 507-520.

Klym, et al., "The Evolution of RFID Networks", The Potential for Distruptive Innovation, VCDWG, CFP, Cambridge University Communications Research Network, Mar. 2006, pp. 1-20.

International Search Report and Written Opinion received for PCT application No. PCT/US2011/065866, mailed on Sep. 14, 2012, 15 pages.

International Preliminary Report on Patentability received for PCT Patent Application No. PCT/US2011/065866, mailed on Jul. 4, 2013, (6 pgs).

* cited by examiner

POSITION DETERMINATION BASED ON PROPAGATION DELAY DIFFERENCES OF MULTIPLE SIGNALS RECEIVED AT MULTIPLE SENSORS

BACKGROUND

Systems have been developed to determine a two-dimensional position of an automobile based on satellite-based global positioning system (GPS) information.

Systems have been developed to determine a position of an object relative to known fixed positions of three or more transmitters, based on phase differences of signals received from the three or more transmitters.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems to determine multi-dimensional coordinates of an object based on propagation delay differences of multiple signals received from the object by each of a plurality of sensors.

Figure 1:
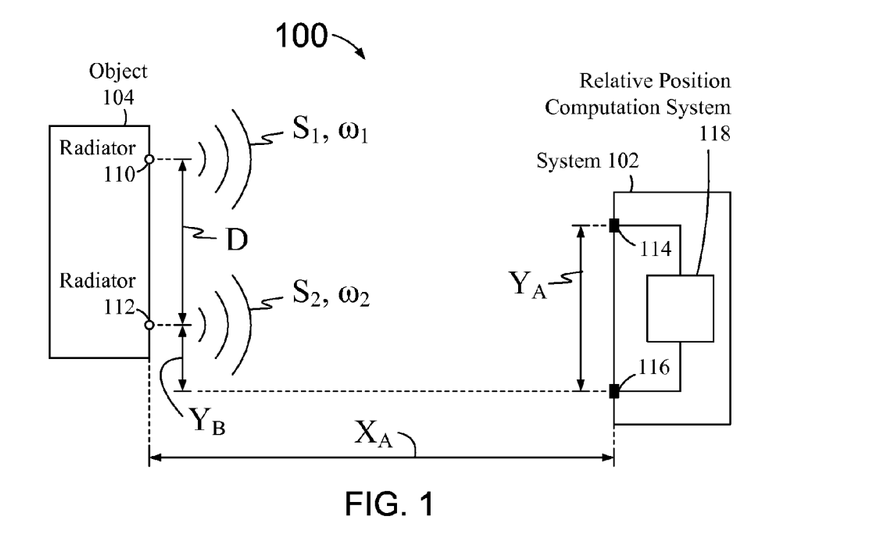
FIG. 1 is a block diagram of a system to determine multi-dimensional coordinates of an object based on one way communication from the object.

FIG. 1 is a block diagram of a system 102 to determine multi-dimensional coordinates of an object 104 based on one way communication from the object.

Object 104 may represent a movable object, such as an automobile.

System 102 may be implemented within a movable object, such as an automobile. Alternatively, system 102 may be implemented as a stationary system.

Object 104 includes a plurality of signal radiator systems, illustrated here as first and second signal radiator systems 110 and 112 to generate and radiate corresponding signals $S_1$ and $S_2$, having corresponding baseband ranging waveforms or frequency tones, referred to generally as tones, $\omega_1$ and $\omega_2$. Tones $\omega_1$ and $\omega_2$ may include continuous wave (CW) radio frequency (RF) tones. Signals $S_1$ and $S_2$ may each include one or more of a radio frequency (RF) tone, an RF carrier modulated with a tone, and a light wave carrier modulated with a tone, such as described below with respect to FIGS. 2-4, respectively.

Figure 2:
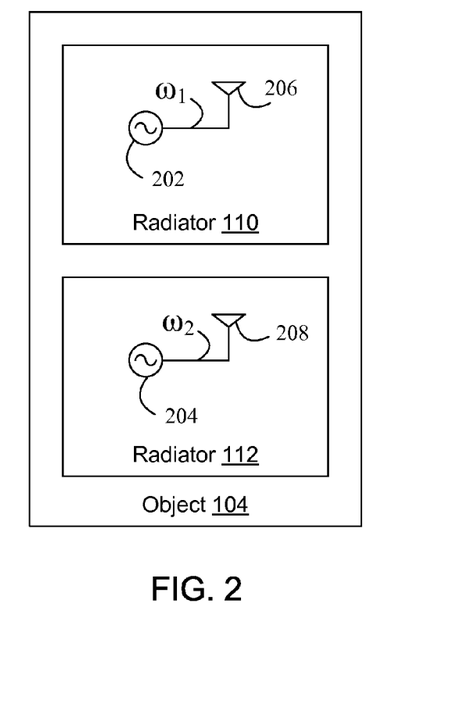
FIG. 2 is a block diagram of the object including tone generators.

FIG. 2 is a block diagram of object 104 wherein radiators 110 and 112 include tone generators 202 and 204 to generate corresponding baseband ranging waveforms or frequency tones, referred to generally as tones, $\omega_1$ and $\omega_2$, and antennas 206 and 208 to radiate corresponding tones $\omega_1$ and $\omega_2$ as signals $S_1$ and $S_2$.

Figure 3:
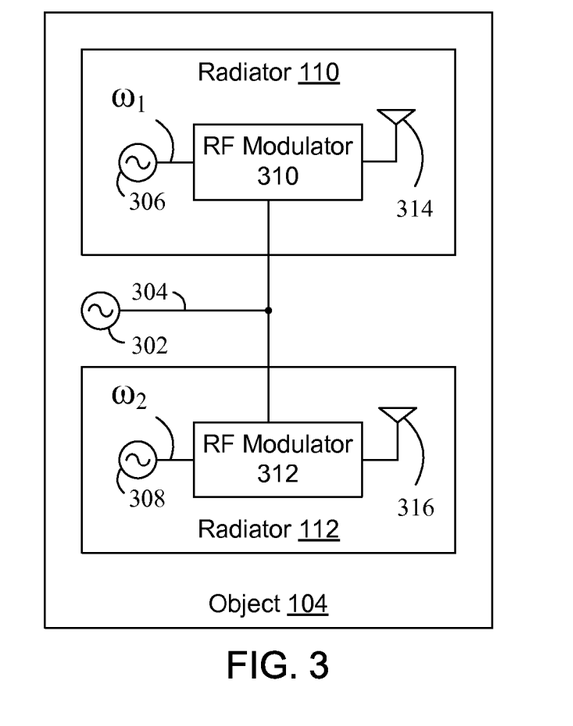
FIG. 3 is a block diagram of the object including tone generators and radio frequency (RF) modulators.

FIG. 3 is a block diagram of object 104, including a local oscillator 302 to generate a local oscillator frequency (LO) 304, wherein radiators 110 and 112 include tone generators 306 and 308 to generate tones $\omega_1$ and $\omega_2$, modulators 310 and 312 to modulate LO 304 with tones $\omega_1$ and $\omega_2$, and antennas 314 and 316 to radiate corresponding modulated tones $\omega_1$ and $\omega_2$ as signals $S_1$ and $S_2$. Modulators 310 and 312 may include amplitude modulators, such as described below.

Figure 4:
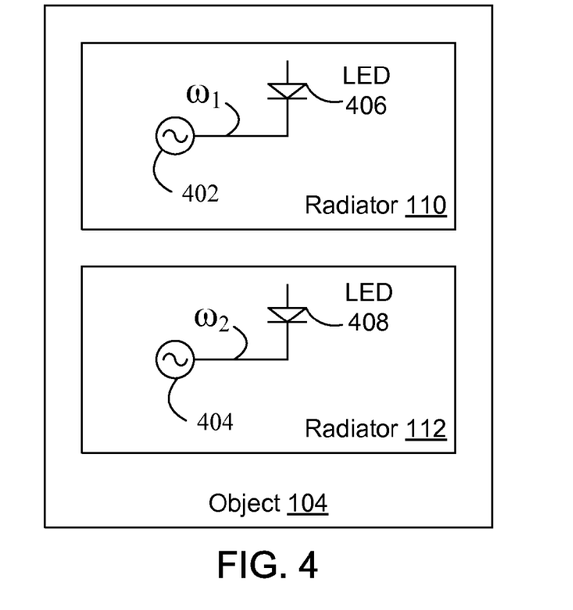
FIG. 4 is a block diagram of the object including tone generators and light modulators.

FIG. 4 is a block diagram of object 104, wherein radiators 110 and 112 include tone generators 402 and 404 to generate tones $\omega_1$ and $\omega_2$, and light emitters 406 and 408 to modulate and emit light with tones $\omega_1$ and $\omega_2$ as signals $S_1$ and $S_2$. Light emitters 406 may include light emitting diodes (LEDs), and may include amplitude modulators, such as described below.

System 102 includes a plurality of sensors, illustrated here as first and second sensors 114 and 116, which may include optical sensors and/or RF receivers, each to receive both of signals $S_1$ and $S_2$.

System 102 further includes a relative position computation system 118 to determine a multi-dimensional position of object 104. In the example of FIG. 1, system 118 is configured to determine a linear distance $X_A$ between system 102 and object 104, and a perpendicular offset distance $Y_B$ between system 102 and object 104.

Perpendicular offset distance $Y_B$ may correspond to a lateral offset distance or a vertical offset distance.

The combination of linear distance $X_A$ and perpendicular offset distance $Y_B$ provides a two dimensional or planar position of object 104 relative to system 102.

Object 104 may include one or more additional radiator systems, and/or system 102 may include one or more additional sensors, and system 118 may be configured to determine a position of object 104 in three or more dimensions.

System 118 may be configured to determine a position of object 104 based a combination of distance D between radiator systems 110 and 112, a distance $X_A$ between sensors 114 and 116, a propagation delay difference of signal $S_1$ as received at sensors 114 and 116, and a propagation delay difference of signal $S_2$ as received at sensors 114 and 116. Propagation delay differences are described below with respect to FIGS. 5 and 6.

Figure 5:
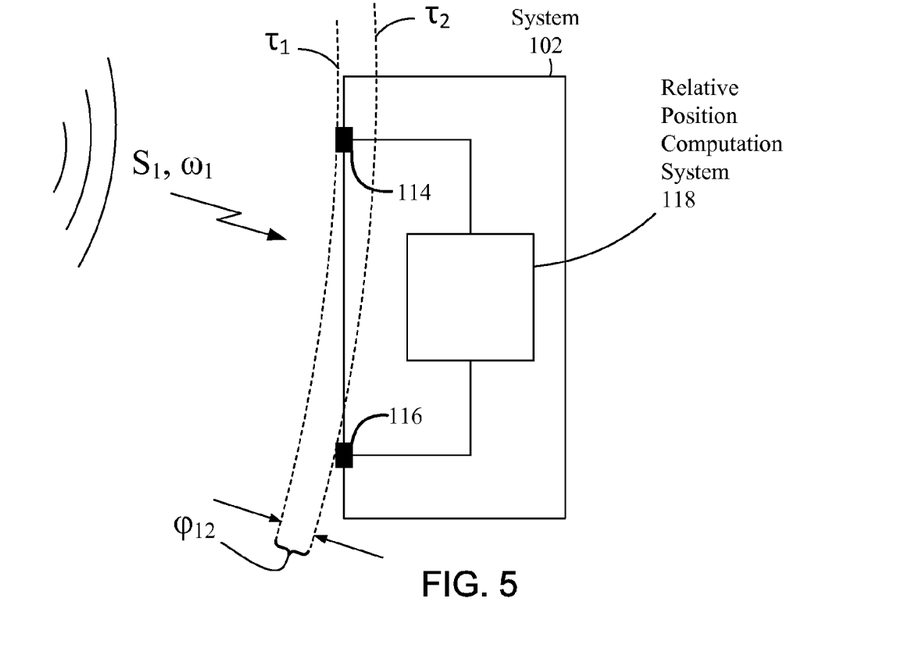
FIG. 5 is a graphic depiction of a first signal received from the object at first and second sensors, with corresponding propagation time delays $\tau_1$ and $\tau_2$.

FIG. 5 is a graphic depiction of signal $S_1$ arriving at sensors 114 and 116, wherein signal $S_1$ arrives at sensor 114 with a propagation time delay $\tau_1$, and at sensor 116 with a propagation time delay $\tau_2$. Depending upon an angle of incidence of signal $S_1$ relative to a plane of sensors 114 and 116, $\tau_1$ may be greater than, equal to, or less than $\tau_2$.

Figure 6:
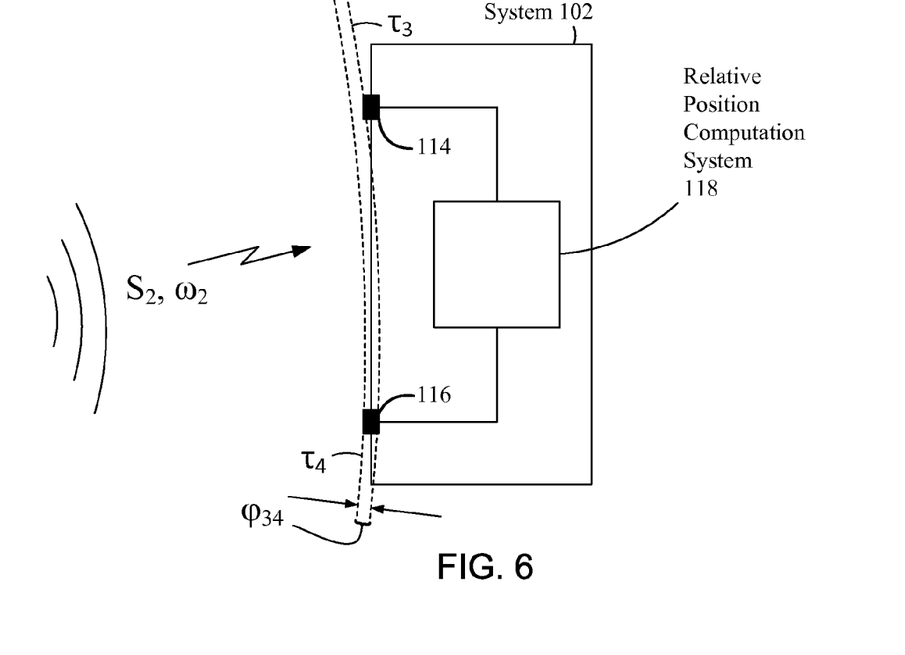
FIG. 6 is a graphic depiction of a second signal received from the object at the first and second sensors, with corresponding propagation time delays $\tau_3$ and $\tau_4$.

FIG. 6 is a graphic depiction of signal $S_2$ arriving at sensors 114 and 116, wherein signal $S_2$ arrives at sensor 114 with a propagation time delay $\tau_3$, and at sensor 116 with a propagation time delay $\tau_4$. Depending upon an angle of incidence of signal $S_2$ relative to the plane of sensors 114 and 116, $\tau_3$ may be greater than, equal to, or less than $\tau_4$.

System 118 may be configured to determine linear distance $X_A$ and perpendicular offset distance $Y_B$, in FIG. 1, from a combination of a difference between $\tau_1$ and $\tau_2$, a difference between $\tau_3$ and $\tau_4$, and distances D and $Y_A$.

For example, signals $S_1$ and $S_2$ may be modulated with corresponding frequency tones $\omega_1$ and $\omega_2$, such as illustrated in FIG. 1, and system 118 may be configured to:

determine a phase difference of arrival $\phi_{A12}$ (FIG. 5) from a combination of $\omega_1$ and a difference between $\tau_1$ and $\tau_2$;

determine a phase difference of arrival $\phi_{A34}$ (FIG. 6) from a combination of $\omega_2$ and a difference between $\tau_3$ and $\tau_4$;

convert phase difference of arrival $\phi_{A12}$ to a distance difference $\Delta_{L12}$, corresponding to difference between a distance from emitter 110 to each of sensors 114 and 116;

convert phase difference of arrival $\phi_{A34}$ to a distance difference $\Delta_{L34}$, corresponding to difference between a distance from emitter 112 to each of sensors 114 and 116; and determine linear distance $X_A$ and perpendicular offset distance $Y_B$ from a combination of distance differences $\Delta_{L12}$ and $\Delta_{L34}$, and distances D and $Y_A$.

Figure 7:
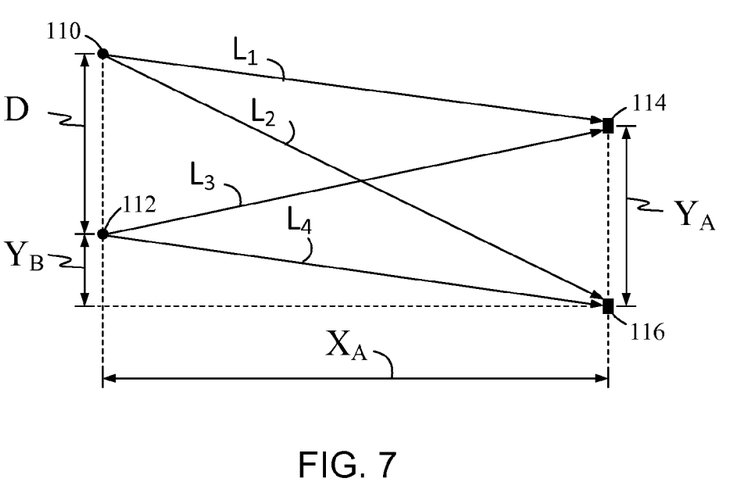
FIG. 7 is a graphic depiction of distances $L_1$ and $L_2$, between a first transmitter and each of first and second sensors, and distances $L_3$ and $L_4$ between a second transmitter and each of the first and second sensors.

FIG. 7 is a graphic depiction of distances $L_1$ and $L_2$, between radiator system 110 and corresponding ones of sensors 114 and 116, and distances $L_3$ and $L_4$ between radiator system 112 and corresponding ones of sensors 114 and 116. Distance difference $\Delta_{L12}$ corresponds to a difference between $L_1$ and $L_2$. Distance difference $\Delta_{L34}$ corresponds to a difference between $L_3$ and $L_3$.

Example methods and systems to determine a position of object 104 are provided below wherein system 102 and object 104 are implemented with respect to automobiles, such as cars. The example methods and systems are not, however, limited to cars or automobiles.

Radiator systems 110 and 112 may be implemented proximate to, or integrated within headlights of car 104, and may include visible light emitters, such as light emitting diodes (LEDs).

Sensors 114 and 116 may be implemented proximate to, or integrated within tail lights of car 102, and may include photo-detectors. Alternatively, or additionally, one or more of sensors 114 and 116 may include an imaging system, which may include one or more of a charge-coupled device (CCD) and a lens system, to provide additional information to system 118, such as directionality information.

System 118 may be configured to determine a position of car 104 based on signals $S_1$ and $S_2$, without communicating to car 104, referred to herein as one-way positioning.

Car 104 may be configured to transmit an indication of distance D to car 102.

Where radiator systems 110 and 112 include visible light emitters, system 102 is referred to herein as a one-way positioning visible light communication (VLC) positioning system.

Signal radiator systems 110 and 112 may be configured to modulate headlights 110 and 112 with corresponding frequency tones $\omega_1$ and $\omega_2$, which may include amplitude modulation (AM). The amplitude modulation may include on-off keying, such as in accordance with a square wave.

Signal radiator systems 110 and 112 may be configured to generate optical carrier signals having a frequency bandwidth in a visible spectrum, which may include a frequency of approximately 500 tera Hertz (THz). The optical carrier signals may have a relatively large bandwidth, such as, for example, approximately several hundred mega HZ (MHz).

On-off keying amplitude modulation of a relatively wideband signal in a visible spectrum may permit signal radiator systems 110 and 112 to be implemented with relatively inexpensive components.

System 118 may be configured to determine a relative position of car 104 based on sub-carrier tone modulation of LED-based light sources 110 and 112.

System 118 may be configured to filter around a demodulated envelope of a carrier signal to extract corresponding RF tones $\omega_1$ and $\omega_2$.

Where signals $S_1$ and $S_2$ are amplitude modulated, signals received at each sensor 114 and 116, due to either of signals $S_1$ and $S_2$ may be represented as:

$$s_{ik}(t)=A_j(1+m\cdot\cos(\omega_k(t+\tau_j)+\theta_k))\cos(\omega_C(t+\tau_j)+\theta_C) \quad \text{(Eq. 1)}$$

where:

$s_{ik}(t)$ is the signal at the $i^{th}$ sensor due to the modulation at the $k^{th}$ headlight;

m is a modulation index ($0<m\leq 1$);

$A_j$ is an attenuation of a $j^{th}$ propagation path with propagation time delay $\tau_j$; and $\omega_k$ is the tone frequency with a starting phase of $\theta_k$.

Figure 8:
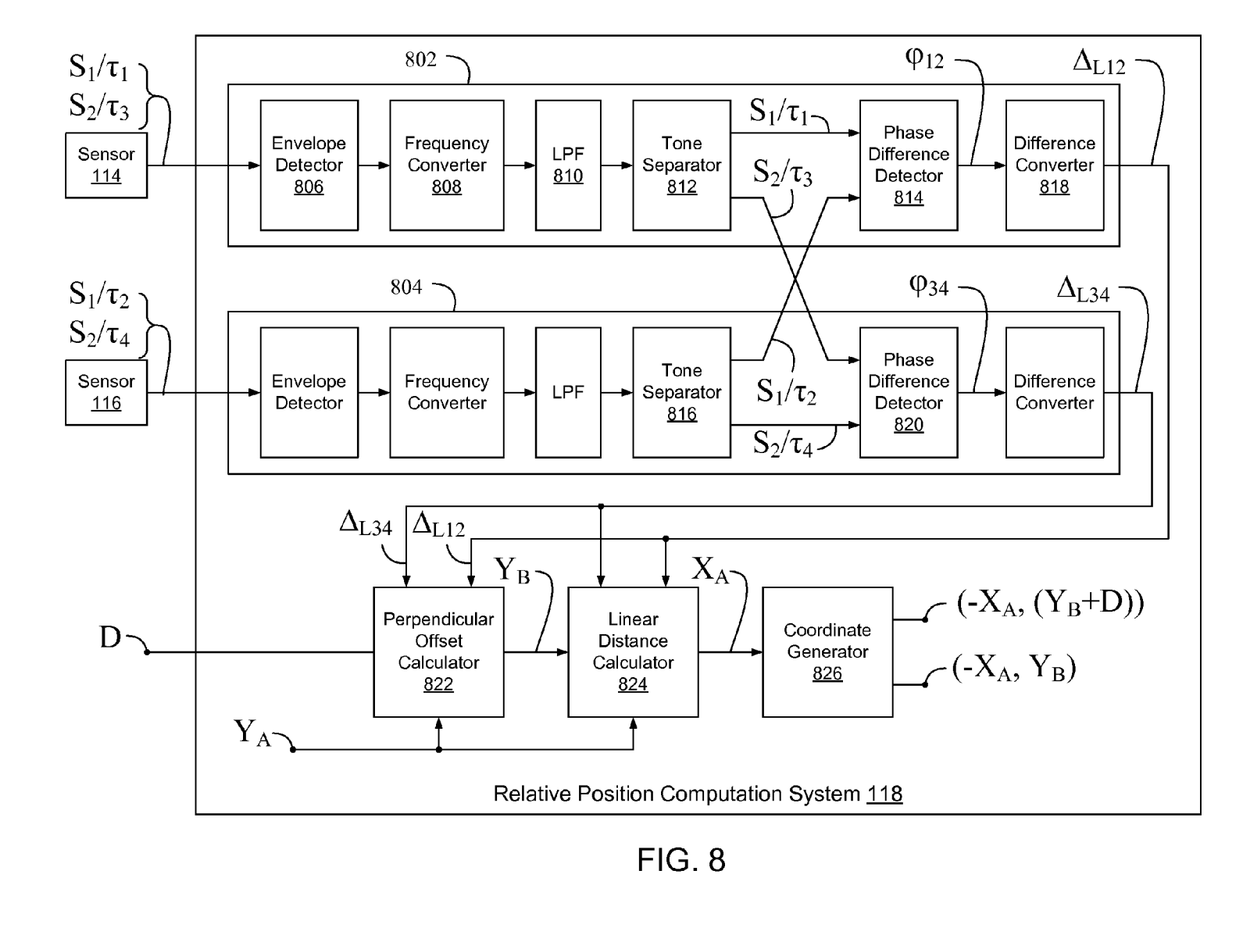
FIG. 8 is a block diagram of a system to process the first and second signals received at each of the first and second sensors.

FIG. 8 is a block diagram of system 118, including a first path 802 to process signals received at sensor 114, and a second path 804 to process signals received at sensor 116. Alternatively, one or more portions of first and second paths may be combined in a common path.

Path 802 is described below. Path 804 may be implemented similar to path 804. Path 802 may include a non-coherent envelope detector 806 to detect envelopes of signals received at sensor 114.

An envelope of a signal received at either of sensors 114 and 116, due to either of signals $S_1$ and $S_2$, may be represented as:

$$s_{ik}(t)=A_j\cdot m\cdot\cos(\omega_k(t+\tau_j)+\theta_k) \quad \text{(Eq. 2)}$$

Equation 2 may be represented using upper sideband complex sinusoids, such as with digital signal processing, as:

$$s_{ik}(t) = \frac{A_j}{2}\cdot m\cdot e^{j\{\omega_k(t+\tau_j)+\theta_k\}} \quad \text{(Eq. 3)}$$

A complex signal at each of taillights 114 and 116, due to signals $S_1$ and $S_2$, may be represented as:

$$s_1(t) = \frac{A_1}{2}\cdot m\cdot e^{j\{\omega_1(t+\tau_1)+\theta_1\}} + \frac{A_3}{2}\cdot m\cdot e^{j\{\omega_2(t+\tau_3)+\theta_2\}} \quad \text{(Eq. 4)}$$

-continued $$s_2(t) = \frac{A_2}{2} \cdot m \cdot e^{j\{\omega_1(t+\tau_2)+\theta_1\}} + \frac{A_4}{2} \cdot m \cdot e^{j\{\omega_2(t+\tau_4)+\theta_2\}} \quad \text{(Eq. 5)}$$

Path 802 may include a frequency converter 808 and a low pass filter (LPF) 810, such as described further below.

Path 802 may include a tone separator 812 to separate tones of signals $S_1$ and $S_2$ from envelopes detected by envelope detector 806. Tone separator 812 may include a band pass filter, which may include a Fast Fourier Transform (FFT) module, which may be implemented in a digital signal processor (DSP). The FFT module may include multiple FFT modules configured to overlap one another in time to provide a sampled, filtered sinusoid. Resultant amplitude and frequency bins may be examined to identify received tones.

Tones of signals $S_1$ and $S_2$, received at either of sensors 114 and 116, may be represented as:

$$s_1^{\omega_1}(t) = \frac{A_1}{2} \cdot m \cdot e^{j\{\omega_1(t+\tau_1)+\theta_1\}} \quad \text{(Eq. 6)}$$

$$s_1^{\omega_2}(t) = \frac{A_3}{2} \cdot m \cdot e^{j\{\omega_2(t+\tau_3)+\theta_2\}} \quad \text{(Eq. 7)}$$

$$s_2^{\omega_1}(t) = \frac{A_2}{2} \cdot m \cdot e^{j\{\omega_1(t+\tau_2)+\theta_1\}} \quad \text{(Eq. 8)}$$

$$s_2^{\omega_2}(t) = \frac{A_4}{2} \cdot m \cdot e^{j\{\omega_2(t+\tau_4)+\theta_2\}} \quad \text{(Eq. 9)}$$

Path 802 may include a phase difference detector 814 to receive signal $S_1$ from tone separator 812 and from a tone separator 816 of path 804 corresponding to sensor 116. Phase difference detector 814 may be configured to determine phase difference of arrival $\phi_{\Delta 12}$ from signal $S_1$ as received at sensors 114 and 116.

Phase differences of arrival $\phi_{\Delta 12}$ and $\phi_{\Delta 34}$ may be represented by the argument of:

$$\phi_{\Delta 12} \propto \arg[s_1^{\omega_1}(t) \cdot conj(s_2^{\omega_1}(t))] \quad \text{(Eq. 10A)}$$
$$= \arg\left[\frac{A_1 A_2}{4} \cdot m^2 \cdot e^{j\{\omega_1(t+\tau_1)+\theta_1\}} e^{-j\{\omega_1(t+\tau_2)+\theta_1\}}\right]$$
$$= \arg\left[\frac{A_1 A_2}{4} \cdot m^2 \cdot e^{j\omega_1(\tau_1-\tau_2)}\right]$$

$$\phi_{\Delta 34} \propto \arg[s_1^{\omega_1}(t) \cdot conj(s_2^{\omega_2}(t))] \quad \text{(Eq. 11A)}$$
$$= \arg\left[\frac{A_3 A_4}{4} \cdot m^2 \cdot e^{j\{\omega_2(t+\tau_3)+\theta_2\}} e^{-j\{\omega_2(t+\tau_4)+\theta_2\}}\right]$$
$$= \arg\left[\frac{A_3 A_4}{4} \cdot m^2 \cdot e^{j\omega_2(\tau_3-\tau_4)}\right]$$

Phase differences of arrival $\phi_{\Delta 12}$ and $\phi_{\Delta 34}$ may be calculated as:

$$\phi_{\Delta 12} = \omega_1(\tau_1-\tau_2) \quad \text{(Eq. 10B)}$$

$$\phi_{\Delta 34} = \omega_2(\tau_3-\tau_4) \quad \text{(Eq. 11B)}$$

System 118 may include a difference converter 818 to convert phase differences of arrivals to corresponding distance differences.

Phase difference of arrivals $\phi_{\Delta 12}$ and $\phi_{\Delta 34}$ in equations 10 and 11, may be converted to corresponding distance differences $\Delta_{L12}$ and $\Delta_{L34}$ as:

$$\Delta_{L12} = L_1 - L_2 = \frac{\phi_{\Delta 12}}{\omega_1} v; \text{ and} \quad \text{(Eq. 12)}$$

$$\Delta_{L34} = L_3 - L_4 = \frac{\phi_{\Delta 34}}{\omega_2} v. \quad \text{(Eq. 13)}$$

where v is the speed of light.

Figure 9:
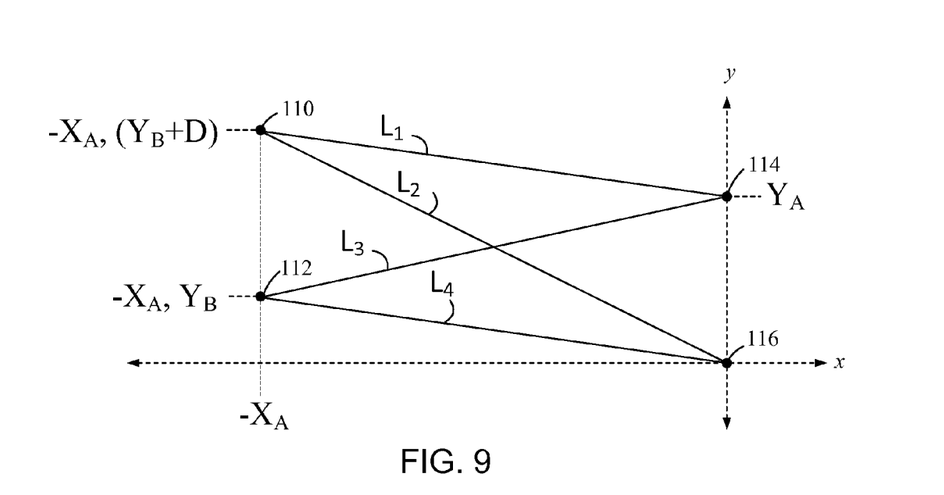
FIG. 9 is a graphic depiction of geometries illustrated in FIGS. 1 and 7, in an x-y plane.

FIG. 9 is a graphic illustration of geometries illustrated in FIGS. 1 and 7, presented in an x-y plane.

Distances $L_1$, $L_2$, $L_3$, and $L_4$, may be represented as:

$$L_1^2 = X_A^2 + (Y_A - Y_B - D)^2 \quad \text{(Eq. 14)}$$

$$L_2^2 = X_A^2 + (Y_B + D)^2 \quad \text{(Eq. 15)}$$

$$L_3^2 = X_A^2 + (Y_A - Y_B)^2 \quad \text{(Eq. 16)}$$

$$L_4^2 = X_A^2 + Y_B^2 \quad \text{(Eq. 17)}$$

Distance differences $\Delta_{L12}$ and $\Delta_{L34}$ may be represented as:

$$\Delta_{L12} = L_1 - L_2 = \sqrt{X_A^2 + (Y_A - Y_B - D)^2} - \sqrt{X_A^2 + (Y_b + D)^2} \quad \text{(Eq. 18)}$$

$$\Delta_{L34} = L_3 - L_4 = \sqrt{X_A^2 + (Y_A - Y_B)^2} - \sqrt{X_A^2 + Y_B^2} \quad \text{(Eq. 19)}$$

Equations 18 and 19 may be rearranged as:

$$\Delta_{L12} + \sqrt{X_A^2 + (Y_B + D)^2} = \sqrt{X_A^2 + (Y_A - Y_B - D)^2} \quad \text{(Eq. 20)}$$

$$\Delta_{L34} + \sqrt{X_A^2 + Y_B^2} = \sqrt{X_A^2 + (Y_A - Y_B)^2} \quad \text{(Eq. 21)}$$

Both sides of equations 20 and 21 may be squared, and resulting terms may be expanded and cancelled to provide, respectively:

$$\Delta_{L12}^2 + 2\Delta_{L12}\sqrt{X_A^2 + (Y_B + D)^2} = Y_A^2 - 2Y_A Y_B - 2DY_A \quad \text{(Eq. 22)}$$

$$\Delta_{L34}^2 + 2\Delta_{L34}\sqrt{X_A^2 + Y_B^2} = Y_A^2 - 2Y_A Y_B \quad \text{(Eq. 23)}$$

Square root terms of equations 22 and 23 may be separated from other terms to provide, respectively:

$$\sqrt{X_A^2 + (Y_B + D)^2} = \frac{Y_A^2 - 2Y_A Y_B - 2DY_A - \Delta_{L12}^2}{2\Delta_{L12}} \quad \text{(Eq. 24)}$$

$$\sqrt{X_A^2 + Y_B^2} = \frac{Y_A^2 - 2Y_A Y_B - \Delta_{L34}^2}{2\Delta_{L34}} \quad \text{(Eq. 25)}$$

Both sides of equations 24 and 25 may be squared, and resulting terms may be expanded and rearranged to provide, respectively:

$$X_A^2 + Y_B^2 = \left(\frac{Y_A^2 - 2Y_A Y_B - 2DY_A - \Delta_{L12}^2}{2\Delta_{L12}}\right)^2 - 2DY_B - D^2 \quad \text{(Eq. 26)}$$

$$X_A^2 + Y_B^2 = \left(\frac{Y_A^2 - 2Y_A Y_B - \Delta_{L34}^2}{2\Delta_{L34}}\right)^2 \quad \text{(Eq. 27)}$$

Equations 26 and 27 may be set equal to one another as:

$$\left(\frac{Y_A^2 - 2Y_A Y_B - 2DY_A - \Delta_{L12}^2}{2\Delta_{L12}}\right)^2 - 2DY_B - D^2 = \left(\frac{Y_A^2 - 2Y_A Y_B - \Delta_{L34}^2}{2\Delta_{L34}}\right)^2 \quad \text{(Eq. 28)}$$

Terms of equation 28 may be expanded as:

$$\left(\frac{\begin{array}{l}Y_A^4 + 4Y_A^2 Y_B^2 + 4D^2 Y_A^2 + \Delta_{12}^4 - 4Y_A^3 Y_B - 4DY_A^3 - \\ 2Y_A^2 \Delta_{L12}^2 + 8Y_A^2 Y_B D + 4Y_A Y_B \Delta_{L12}^2 + 4DY_A \Delta_{L12}^2\end{array}}{4\Delta_{L12}^2}\right) - $$
$$2DY_B - D^2 = $$
$$\left(\frac{Y_A^4 + 4Y_A^2 Y_B^2 + \Delta_{L34}^4 - 4Y_A^3 Y_B - 2Y_A^2 \Delta_{L34}^2 + 4Y_A Y_B \Delta_{L34}^2}{4\Delta_{L34}^2}\right)$$
(Eq. 29)

Equation 29 may be rearranged in the form of a quadratic equation:

$$AY_B^2 + BY_B + C = 0 \quad \text{(Eq. 30)}$$

where:

$$A = Y_A^2 \left(\frac{1}{\Delta_{L12}^2} - \frac{1}{\Delta_{L34}^2}\right); \quad \text{(Eq. 31)}$$

$$B = \left(\frac{-Y_A^3 + 2Y_A^2 D + Y_A \Delta_{L12}^2}{\Delta_{L12}^2}\right) - 2D - \left(\frac{-Y_A^3 + Y_A \Delta_{L34}^2}{\Delta_{L34}^2}\right); \quad \text{(Eq. 32)}$$

$$C = \left(\frac{Y_A^4 + 4D^2 Y_A^2 + \Delta_{12}^4 - 4DY_A^3 - 2Y_A^2 \Delta_{L12}^2 + 4DY_A \Delta_{L12}^2}{4\Delta_{L12}^2}\right) - $$
$$D^2 - \left(\frac{Y_A^4 + \Delta_{L34}^4 - 2Y_A^2 \Delta_{L34}^2}{4\Delta_{L34}^2}\right) \quad \text{(Eq. 33)}$$

Terms A, B and C are defined in terms of known quantities, and $Y_B$ may be solved as:

$$Y_B = \frac{-B \pm \sqrt{B^2 - 4AC}}{2A} \quad \text{(Eq. 34A)}$$

A determination as to whether to use the positive or negative value of the square root term in equation 34A may be based on whether $\Delta_{L12}$ is greater than or less than $\Delta_{L34}$.

Where $\Delta_{L12} \cdot \Delta_{L34} > 0$, the negative value of the square root term of equation 34A may be used, such that:

$$Y_B = \frac{-B - \sqrt{B^2 - 4AC}}{2A} \quad \text{(Eq. 34B)}$$

Where $\Delta_{L12} \cdot \Delta_{L34} < 0$, the positive value of square root term of equation 34A may be used, such that:

$$Y_B = \frac{-B + \sqrt{B^2 - 4AC}}{2A} \quad \text{(Eq. 34C)}$$

Where $\Delta_{L12}$ is equal to zero, $L_1$ and $L_2$ in FIG. 9 are equal to one another, and $Y_B$ may be determined as disclosed below with respect to FIG. 10.

Figure 10:
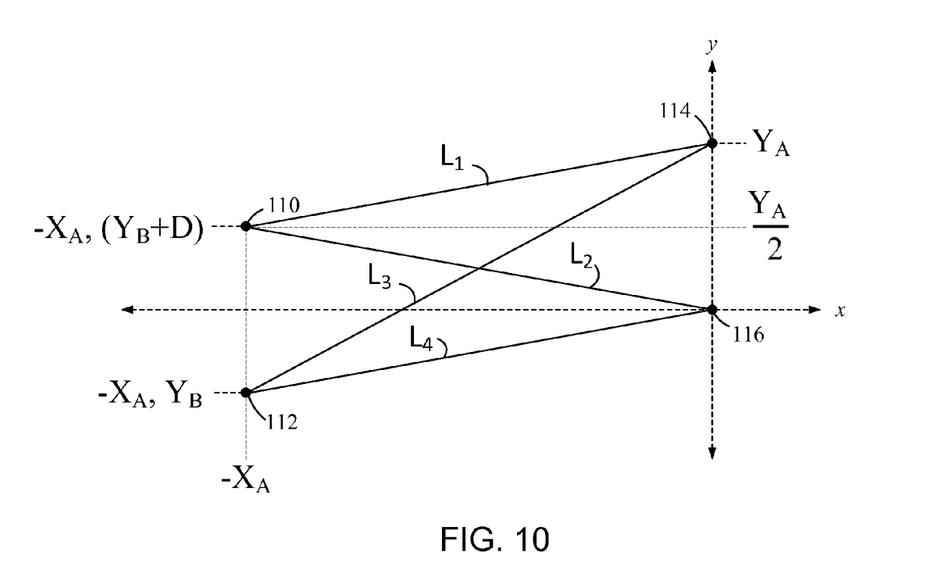
FIG. 10 is a graphic depiction of the geometries of FIG. 9, where $L_1 = L_2$.

FIG. 10 is a graphic depiction of the geometries of FIG. 9, for a situation where $L_1 = L_2$. As illustrated in FIG. 10:

$$Y_B = \frac{Y_A}{2} - D \quad \text{(Eq. 34D)}$$

Where $\Delta_{L34}$ is equal to zero, $L_3$ and $L_4$ of FIG. 9 are equal to one another, and $Y_B$ may be determined as disclosed below with respect to FIG. 11.

Figure 11:
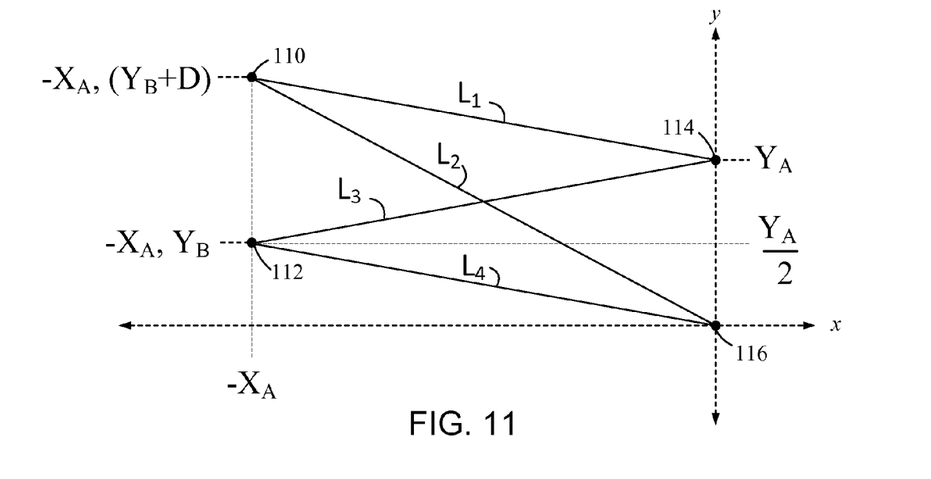
FIG. 11 is a graphic depiction of the geometries of FIG. 9, where $L_3 = L_4$.

FIG. 11 is a graphic depiction of the geometries of FIG. 9, for a situation where $L_3 = L_4$. As illustrated in FIG. 11:

$$Y_B = \frac{Y_A}{2} \quad \text{(Eq. 34E)}$$

Given $Y_B$, equation 27 may be rearranged to solve for $X_A$:

$$X_A = \pm \sqrt{\left(\frac{Y_A^2 - 2Y_A Y_B - \Delta_{L34}^2}{2\Delta_{34}}\right)^2 - Y_B^2} \quad \text{(Eq. 35)}$$

Figure 12:
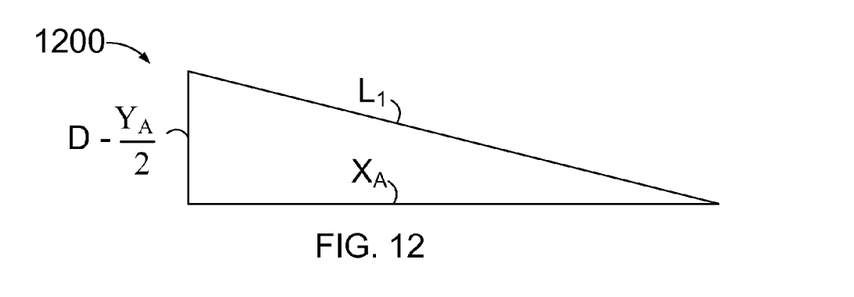
FIG. 12 is a graphic depiction of a triangle of FIG. 11, having a hypotenuse of $L_1$.

Due to the directionality of sensors 114 and 116, equations 35 may be solved for $X_A$ using the negative of the square root term of equation 35.

Where $L_3 = L_4$ and $\Delta_{L34} = 0$, as illustrated in FIG. 11, two triangles may be identified having respective hypotenuses of $L_1$ and $L_2$, as described below with respect to FIGS. 129 and 13.

FIG. 12 is a graphic depiction of a triangle 1200 having a hypotenuse $L_1$.

Figure 13:
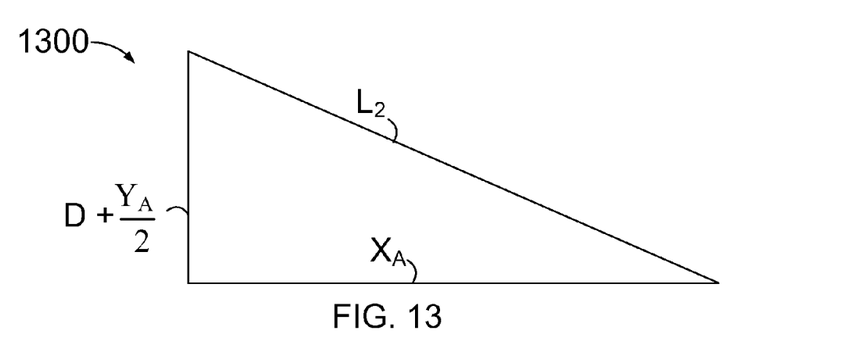
FIG. 13 is a graphic depiction of a triangle of FIG. 11, having a hypotenuse of $L_2$.

FIG. 13 is a graphic depiction of a triangle 1300 having a hypotenuse $L_2$.

From the geometries of FIGS. 9 and 10, $L_1$ and $L_2$ may be represented as:

$$L_1^2 = X_A^2 + \left(D - \frac{Y_A}{2}\right)^2 \quad \text{(Eq. 36)}$$

$$L_2^2 = X_A^2 + \left(D + \frac{Y_A}{2}\right)^2 \quad \text{(Eq. 37)}$$

Distance difference $\Delta_{L12}$, which may be determined as described above, may thus be represented as:

$$\Delta_{L12} = L_1 - L_2 = \sqrt{X_A^2 + \left(D - \frac{Y_A}{2}\right)^2} - \sqrt{X_A^2 + \left(D + \frac{Y_A}{2}\right)^2} \quad \text{(Eq. 38)}$$

Terms of equation 38 may be rearranged as:

$$\sqrt{X_A^2 + \left(D + \frac{Y_A}{2}\right)^2} + \Delta_{L12} = \sqrt{X_A^2 + \left(D - \frac{Y_A}{2}\right)^2} \quad \text{(Eq. 39)}$$

Both sides of equation 39 may squared, and resultant terms may be rearranged and cancelled, to provide:

$$\sqrt{X_A^2 + \left(D + \frac{Y_A}{2}\right)^2} = \frac{-2Y_A D - \Delta_{L12}^2}{2\Delta_{L12}}. \quad \text{(Eq. 40)}$$

Both sides of equation 40 may be squared, and resultant terms may be rearranged to solve for $X_A$ when $\Delta_{L34} = 0$, as:

$$X_A = \sqrt{\left(\frac{2Y_A D + \Delta_{L12}^2}{2\Delta_{L12}}\right)^2 - \left(D + \frac{Y_A}{2}\right)^2} \quad \text{(Eq. 41)}$$

In FIG. 8, system 118 may include a perpendicular offset calculator 822 to calculate perpendicular offset distance $Y_B$ from distance differences $\Delta_{L12}$, $\Delta_{L34}$, and distances D and $Y_A$, such as described above with respect to one or more of equations 34A through 34E.

System 118 may further include a linear distance calculator 824 to calculate linear distance $X_A$ from a combination of distance differences $\Delta_{L12}$ and $\Delta_{L34}$, perpendicular offset distance $Y_B$, and distance $Y_A$, such described above with respect to one or more of equations and 35 and 41.

System 118 may further include a coordinate generator 826 to generate coordinates $(-X_A, (Y_B+D))$ and $(-X_A, Y_B)$. In this example, coordinates $(-X_A, (Y_B+D))$ represent two-dimensional coordinates of signal radiator 110 (FIG. 1) relative to sensor 116 (FIG. 1), and coordinates $(-X_A, Y_B)$ represent two-dimensional coordinates of signal radiator 112 (FIG. 1) relative to sensor 116 (FIG. 1). More generally, coordinate generator 826 may be configured to determine at least two-dimensional coordinates for each of first and second signal radiators 110 and 112 relative to a sensor.

Figure 14:
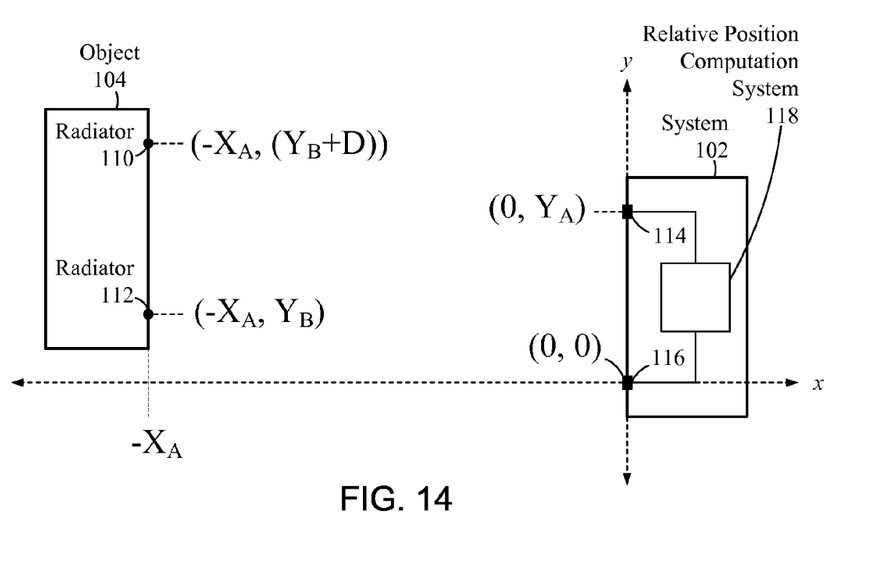
FIG. 14 is a graphic depiction of coordinates of the object in an x-y plane.

FIG. 14 is a graphic depiction of coordinates of car 104 relative to car 102 in the x-y plane. In FIG. 14, the coordinates of car 104 are provided with respect to headlights 110 and 112 of car 104, relative to tail light 116 of car 102. One or more offset values may be incorporated to provide coordinates with respect to one or more other features, such as a width of car 104.

In FIG. 8, system 118 may include a frequency converter 808 to generate a lower frequency image of a detected envelope. Subsequent processing may be performed with respect to the lower frequency image, which may simplify the subsequent processing.

Frequency converter 808 may include a heterodyne frequency converter to mix an envelope tone provided by envelope detector 806 with a local oscillator to generate products of the envelope at heterodyned frequencies. System 118 may further include a relatively low pass filter 810 to filter unwanted products, and to provide a relatively low frequency image of the envelope tone to tone separator 812.

Where frequency converter 808 receives a signal as represented in equation 2 above, LPF 810 may provide an output in the form of:

$$s_{ik}(t) = A_j \cdot m \cdot \cos(\omega_k(t+\tau_j) + \theta_k) \cdot \cos(\omega_O t + \theta_O) \stackrel{lpf}{=} \quad \text{(Eq. 42)}$$
$$\frac{A_j \cdot m}{2} \cdot \cos\{(\omega_k - \omega_O)t + \omega_k \tau_j + (\theta_k - \theta_O)\}$$

Equation 42 may be expressed using upper sideband complex sinusoids, such as with digital signal processing, as:

$$s_{ik}(t) = \frac{A_j}{4} \cdot m \cdot e^{j\{(\omega_k - \omega_O)t + \omega_k \tau_j + (\theta_k - \theta_O)\}} \quad \text{(Eq. 43)}$$

The complex signal at either of sensors 114 and 116, corresponding to signals $S_1$ and $S_2$, may be represented as:

$$s_1(t) = \frac{A_1}{4} \cdot m \cdot e^{j\{(\omega_1 - \omega_O)t + \omega_1 \tau_1 + (\theta_1 - \theta_O)\}} + \quad \text{(Eq. 44)}$$
$$\frac{A_3}{4} \cdot m \cdot e^{j\{(\omega_2 - \omega_O)t + \omega_2 \tau_1 + (\theta_2 - \theta_O)\}}$$

$$s_2(t) = \frac{A_2}{4} \cdot m \cdot e^{j\{(\omega_1 - \omega_O)t + \omega_1 \tau_2 + (\theta_1 - \theta_O)\}} + \quad \text{(Eq. 45)}$$
$$\frac{A_4}{4} \cdot m \cdot e^{j\{(\omega_2 - \omega_O)t + \omega_2 \tau_4 + (\theta_2 - \theta_O)\}}$$

Tone separators 812 and 816 may each separate signals $S_1$ and $S_2$ from corresponding inputs, such as with DSP-based band pass filtering or FFT processing, to provide:

$$s_1^{\omega_1}(t) = \frac{A_1}{4} \cdot m \cdot e^{j\{(\omega_1 - \omega_O)t + \omega_1 \tau_1 + (\theta_1 - \theta_O)\}} \quad \text{(Eq. 46)}$$

$$s_1^{\omega_2}(t) = \frac{A_3}{4} \cdot m \cdot e^{j\{(\omega_2 - \omega_O)t + \omega_2 \tau_1 + (\theta_2 - \theta_O)\}} \quad \text{(Eq. 47)}$$

$$s_2^{\omega_1}(t) = \frac{A_2}{4} \cdot m \cdot e^{j\{(\omega_1 - \omega_O)t + \omega_1 \tau_2 + (\theta_1 - \theta_O)\}} \quad \text{(Eq. 48)}$$

$$s_2^{\omega_2}(t) = \frac{A_4}{4} \cdot m \cdot e^{j\{(\omega_2 - \omega_O)t + \omega_2 \tau_4 + (\theta_2 - \theta_O)\}} \quad \text{(Eq. 49)}$$

Phase difference detectors 814 and 820 may be configured to determine corresponding phase differences of arrival $\phi_{\Delta 12}$ and $\phi_{\Delta 34}$ as:

$$\phi_{\Delta 12} \propto \arg[s_1^{\omega_1}(t) \text{conj}(s_2^{\omega_1}(t))] = \quad \text{(Eq. 50A)}$$
$$\arg\left[\frac{A_1 A_2}{16} \cdot m^2 \cdot \begin{array}{c} e^{j\{(\omega_1 - \omega_O)t + \omega_1 \tau_1 + (\theta_1 - \theta_O)\}} \\ e^{-j\{(\omega_1 - \omega_O)t + \omega_1 \tau_2 + (\theta_1 - \theta_O)\}} \end{array}\right] =$$
$$\arg\left[\frac{A_1 A_2}{16} \cdot m^2 \cdot e^{j\omega_1(\tau_1 - \tau_2)}\right]$$

$$\phi_{\Delta 34} \propto \arg[s_1^{\omega_2}(t) \text{conj}(s_2^{\omega_2}(t))] = \quad \text{(Eq. 51A)}$$
$$\arg\left[\frac{A_3 A_4}{16} \cdot m^2 \cdot \begin{array}{c} e^{j\{(\omega_2 - \omega_O)t + \omega_2 \tau_1 + (\theta_2 - \theta_O)\}} \\ e^{-j\{(\omega_2 - \omega_O)t + \omega_2 \tau_4 + (\theta_2 - \theta_O)\}} \end{array}\right] =$$
$$\arg\left[\frac{A_3 A_4}{16} \cdot m^2 \cdot e^{j\omega_2(\tau_3 - \tau_4)}\right]$$

Phase differences of arrival $\phi_{\Delta 12}$ and $\phi_{\Delta 34}$ may be calculated as:

$$\phi_{\Delta 12} = \omega_1(\tau_1 - \tau_2) \quad \text{(Eq. 50B)}$$

$$\phi_{\Delta 34} = \omega_2(\tau_3 - \tau_4) \quad \text{(Eq. 51B)}$$

As illustrated by equations above, heterodyning the modulation tones to a lower frequency may be performed substantially without distorting the modulation tones.

Considerations of the frequency of baseband tones $\omega_1$ and $\omega_2$ are now addressed.

A relatively high frequency baseband tone may provide greater accuracy than lower frequency tones.

Anti-phase-aliasing considerations may call for relatively lower frequencies. For example, equation 10 illustrates a relationship between phase difference of arrival $\phi_{\Delta 12}$, $\tau_1$ and $\tau_2$, and frequency $\omega_1$. FIG. 14 illustrates a relationship between phase difference of arrival $\phi_{\Delta 34}$, $\tau_3$ and $\tau_4$, and frequency $\omega_2$. To avoid phase aliasing, phase differences of arrival $\phi_{\Delta 12}$ and $\phi_{\Delta 34}$ should be constrained to not exceed $\pi$ radians.

The largest phase delta may correspond to $\tau_1=0$ and $\tau_4=0$, such as where $X_A$ is zero, in which case $\tau_2$ and $\tau_3$ are determined by a difference between distances D and $Y_A$. Where system 102 and object 104 correspond to automobiles, and where traffic lanes are at least approximately 3 meters wide, a maximum delay for $\tau_2$ and $\tau_3$ may be set to approximately 10 nano second (ns), which corresponds to:

$$\omega_i < \frac{2\pi}{20e-9} \quad \text{(Eq. 52)}$$

or a frequency less than approximately 50 MHz.

Figure 15:
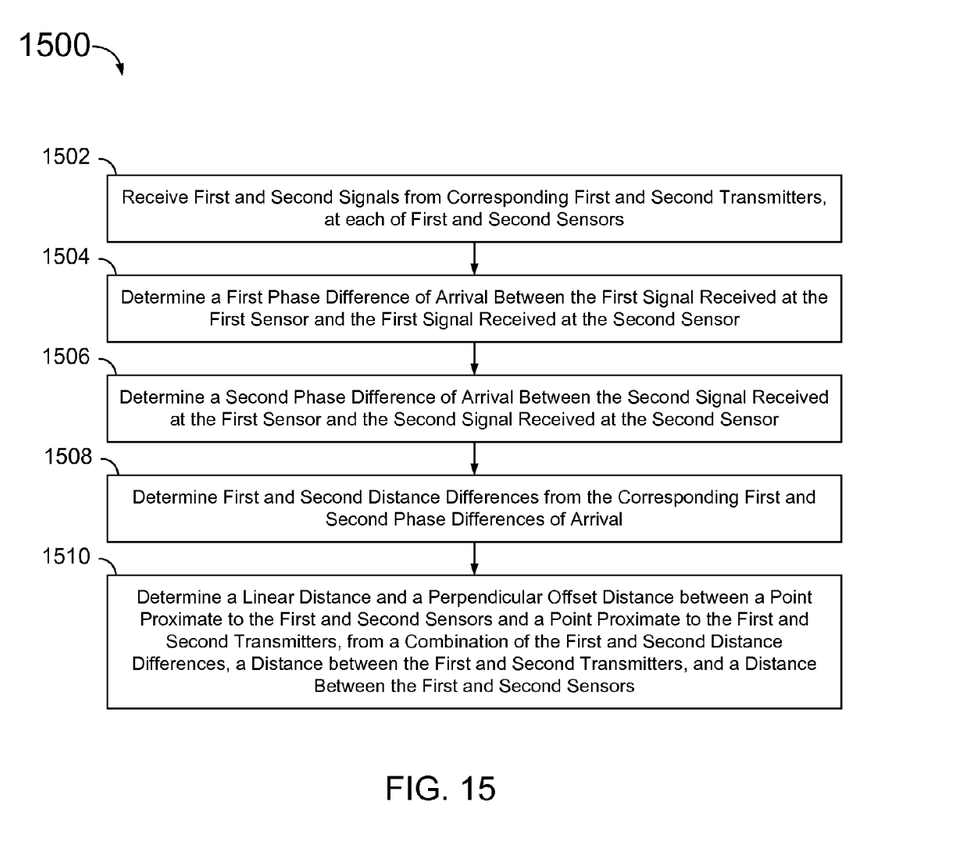
FIG. 15 is a process flowchart of a method of determining multi-dimensional coordinates of an object based on propagation delay differences of multiple signals received at multiple sensors.

FIG. 15 is a process flowchart of a method 1500 of determining multi-dimensional positions of objects based on propagation delay differences of multiple signals received at multiple sensors. Method 1500 may be implemented such as described above with respect to system 118. Method 1500 is not, however, limited to the example of system 118.

At 1502, first and second signals, from corresponding first and second transmitters, are received at each of first and second sensors. The first and second signals may include one or more optical signals, optical signals in a visible spectrum, RF signals, and modulated signals, including amplitude modulated signals, such as described in one or more examples above. The first and second transmitters may have a fixed distance therebetween, and the first and second sensors may have a fixed distance therebetween. The first and second transmitters, and/or the first and second sensors, may be affixed to an object, which may include a movable object, such as a automobile, water craft, or aircraft.

At 1504, a first phase difference of arrival is determined with respect to the first signal received at the first sensor and the first signal received at the second sensor.

At 1506, a second phase difference of arrival is determined with respect to the second signal received at the first sensor and the second signal received at the second sensor.

The first and second phase differences of arrival may be determined in accordance with equations 10B and 11B.

At 1508, the first and second phase differences of arrival are converted to corresponding first and second distance differences.

At 1510, a linear distance and a perpendicular offset distance are determined, between a point proximate to the first and second sensors and a point proximate to the first and second transmitters. The perpendicular offset distance may be determined in accordance with one or more of equations 34A through 34E. The linear distance may be determined in accordance with one or more of equations 35 and 41.

Method 1500 may be implemented to generate two-dimensional planar coordinates and/or to generate coordinates in multiple planes. For example, the perpendicular offset distance may correspond to one or more of a lateral offset distance, vertical offset distance, a diagonal offset distance, and combinations thereof. This may include determining at least two-dimensional coordinates for each of first and second transmitters relative to a sensor, such as described above with respect to coordinate generator 826 in FIG. 8.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

In FIG. 1, system 118 may be implemented with integrated circuit logic, a computer system configured with appropriate software, and combinations thereof.

Figure 16:
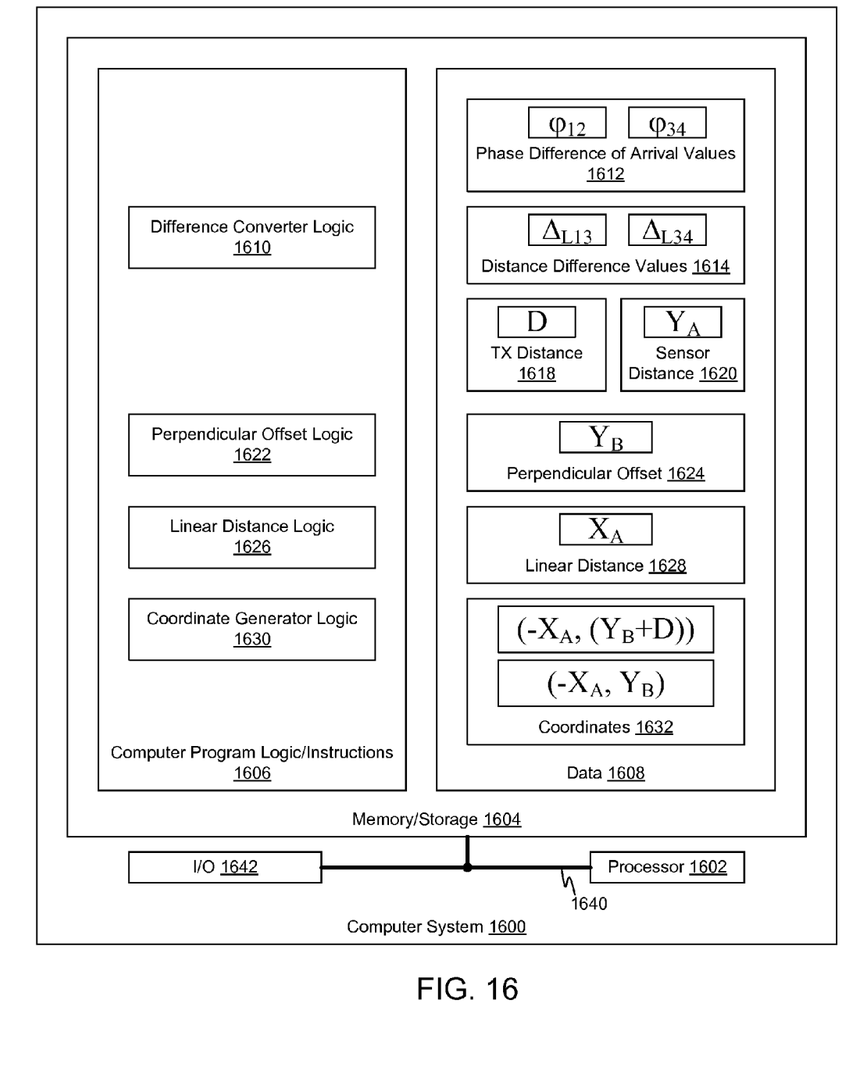
FIG. 16 is a block diagram of a computer system configured to determine multi-dimensional coordinates of an object based on propagation delay differences of multiple signals received at multiple sensors.

FIG. 16 is a block diagram of a computer system 1600, including one or more computer instruction processing units, illustrated here as a processor 1602, to execute computer program product logic, also known as instructions, code, and software.

As described below, computer system 1600 is configured to determine multi-dimensional positions of objects based on propagation delay differences of multiple signals received at multiple sensors.

Computer system 1600 includes memory/storage 1604, including a computer readable medium having computer program product logic or instructions 1606 stored thereon to cause processor 1602 to perform one or more functions in response thereto.

Memory/storage 1604 further includes data 1608 to be used by processor 1602 in executing instructions 1606, and/or generated by processor 1602 in response to execution of instructions 1606.

Logic 1606 includes difference converter logic 1610 to cause processor 1602 to convert phase difference of arrival values 1612 to distance difference values 1614, such as described in one or more examples above.

Computer system 1600 may be configured to receive phase difference of arrival values 1612 from a phase difference detector, such as described above with respect to 814 in FIG. 8, which may be implemented within integrated circuitry.

Alternatively, computer system 1600 may include phase difference detector logic to cause processor 1602 to generate phase difference of arrival values 1612. Computer system 1600 may further include tone separator logic to cause processor 1602 to separate tones from an envelope, such as described above with respect to tone separator 812 in FIG. 8.

Alternatively, difference converter logic 1610 may be implemented within integrated circuitry, and computer system 1600 may be configured to receive distance difference values 1614 from such circuitry.

Logic 1606 further includes perpendicular offset logic 1622 to cause processor 1602 to determine a perpendicular offset distance 1624 from a combination of distance difference values 1614, a transmitter distance 1618, and a sensor distance 1620, such as described in one or more examples above. Perpendicular offset logic 1622 may include logic to determine perpendicular offset distance 1624 in accordance with one or more of equations 34A through 34E.

Logic 1606 further includes linear distance logic 1626 to cause processor 1602 to determine a linear distance 1628 from a combination of distance difference values 1614, perpendicular offset distance 1624, and transmitter distance 1618, such as described in one or more examples above. The linear distance logic 1626 may include logic to determine linear distance 1628 in accordance with one or more of equations 35 and 41.

Logic 1606 further includes coordinate generator logic 1630 to cause processor 1602 to generate coordinates 1632 corresponding to a relative position of an object based on perpendicular offset distance 1624 and linear distance 1628. Coordinates 1632 include at least two-dimensional planar coordinates, and may include coordinates in more than two dimensions.

Computer system 1600 may include a communications infrastructure 1640 to provide one or more communication paths within computer system 1600.

Computer system 1600 may include an input/output (I/O) controller 1642 to provide one or more communication paths between computer system 1600 and one or more other systems and/or communication systems.

Methods and systems disclosed herein may be implemented to provide discrete snap-shots of a position of an object. Multiple discrete Snap-shots may be tracked over to provide motion or movement information, such as for traffic monitoring and/or control, or trajectory analysis, such as with respect to security or collision detection/avoidance.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

What is claimed is:

1. A method, comprising:
   receiving first and second signals from corresponding first and second transmitters, at each of first and second sensors; and
   determining at least two-dimensional coordinates for each of the first and second transmitters relative to the first sensor based on a first phase difference between the first signal as received at the first sensor and the first signal as received at the second sensor, a second phase difference between the second signal as received at the first sensor and the second signal as received at the second sensor, a distance between the first and second transmitters, and a distance between the first and second sensors;
   wherein the determining is performed using at least one of circuitry and a suitably programmed computer processor.

2. The method of claim 1, wherein the determining includes:
   determining first and second distance differences from the corresponding first and second phase differences; and
   determining a linear distance and perpendicular offset distance from a combination of the first and second distance differences, a distance between the first and second transmitters, and a distance between the first and second sensors.

3. The method of claim 2, wherein the determining the linear distance and the perpendicular offset distance includes:
   determining the perpendicular offset distance from a combination of the first and second distance differences, the distance between the first and second transmitters, and the distance between the first and second sensors; and
   determining the linear distance from a combination of the perpendicular offset distance, the first and second distance differences, and the distance between the first and second sensors.

4. The method of claim 2, wherein the determining the perpendicular offset distance includes:
   determining the perpendicular offset distance using a first computation when the product of the first distance difference and the second distance difference is greater than zero; and
   determining the perpendicular offset distance using a second computation when the product of the first distance difference and the second distance difference is less than zero.

5. The method of claim 2, wherein the determining the perpendicular offset distance includes:
   determining the perpendicular offset distance as one half of the distance between the first and second sensors, minus the distance between the first and second transmitters, when the first distance difference is equal to zero; and
   determining the perpendicular offset distance as one half of the distance between the first and second sensors when the second distance difference is equal to zero.

6. The method of claim 2, wherein the determining the linear distance includes:
   determining the linear distance independent of the perpendicular offset distance when the second distance difference is equal to zero.

7. The method of claim 2, wherein the determining of the perpendicular offset distance includes determining a lateral offset distance and a vertical offset distance.

8. The method of claim 1, wherein the receiving includes:
   receiving first and second amplitude modulated optical signals at each of first and second optical sensors.

9. A system, comprising:
   first and second sensors, each to receive a first signal from a first transmitter and a second signal from a second transmitter; and
   a computation system to determine at least two-dimensional coordinates of each of the first and second transmitters relative to the first sensor based on a first phase difference between the first signal as received at the first sensor and the first signal as received at the second sensor, a second phase difference between the second signal as received at the first sensor and the second signal as received at the second sensor, a distance between the first and second transmitters, and a distance between the first and second sensors.

10. The system of claim 9, wherein the computation system includes:
    a phase difference detector to determine the first and second phase differences;
    a difference converter to convert the first and second phase differences to corresponding first and second distance differences; and
    a calculator system to determine a linear distance and perpendicular offset distance from a combination of the first and second distance differences, a distance between the first and second transmitters, and a distance between the first and second sensors.

11. The system of claim 10, wherein the computation system includes:
    a perpendicular offset calculator to determine the perpendicular offset distance from a combination of the first and second distance differences, the distance between the first and second transmitters, and the distance between the first and second sensors; and
    a linear distance calculator to determine the linear distance from a combination of the perpendicular offset distance, the first and second distance differences, and the distance between the first and second sensors.

12. The system of claim 10, wherein the computation system includes a perpendicular offset calculator to:
    determine the perpendicular offset distance as one half of the distance between the first and second sensors, minus the distance between the first and second transmitters, when the first distance difference is equal to zero; and
    determine the perpendicular offset distance as one half of the distance between the first and second sensors when the second distance difference is equal to zero.

13. The system of claim 9, wherein the first and second sensors include first and second optical sensors to receive and convert amplitude modulated optical signals and to electrical signals.

14. The system of claim 9, wherein the computation system is configured to generate at least three-dimensional coordinates.

15. The system of claim 9, further including:
an automobile configured to house the first and second sensors.

16. The system of claim 9, further including:
an automobile configured to house the first and second transmitters.

17. A non-transitory computer readable medium encoded with a computer program, including instructions to cause a processor to:
receive information corresponding to first and second signals received from corresponding first and second transmitters at each of first and second sensors; and
determine at least two-dimensional coordinates for each of the first and second transmitters relative to the first sensor based on a first phase difference between the first signal as received at the first sensor and the first signal as received at the second sensor, a second phase difference between the second signal as received at the first sensor and the second signal as received at the second sensor, a distance between the first and second transmitters, and a distance between the first and second sensors.

18. The non-transitory computer readable medium of claim 17, further including instructions to cause the processor to:
determine a perpendicular offset distance from a combination of,
a first distance difference corresponding to a propagation delay time difference of the first signal received at first and second sensors,
a second distance difference corresponding to a propagation delay time difference of the second signal received at the first and second sensors,
a distance between the first and second transmitters, and
a distance between the first and second sensors; and
determine a linear distance from a combination of the perpendicular offset distance, the first and second distance differences, and the distance between the first and second sensors.

19. The non-transitory computer readable medium of claim 18, further including instructions to cause the processor to:
determine the perpendicular offset distance using a first computation when the product of the first distance difference and the second distance difference is greater than zero; and
determine the perpendicular offset distance using a second computation when the product of the first distance difference and the second distance difference is less than zero.

20. The non-transitory computer readable medium of claim 18, further including instructions to cause the processor to:
determine the perpendicular offset distance as one half of the distance between the first and second sensors, minus the distance between the first and second transmitters, when the first distance difference is equal to zero; and
determine the perpendicular offset distance as one half of the distance between the first and second sensors when the second distance difference is equal to zero.

* * * * *